United States Patent
Chen (10) Patent No.: US 10,099,612 B2
(45) Date of Patent: Oct. 16, 2018

(54) WIRELESS WARNING LIGHT FOR VEHICLE DOOR

(71) Applicant: DEFEND GROUP CO., LTD., Kaohsiung (TW)

(72) Inventor: Chih-Chiang Chen, Kaohsiung (TW)

(73) Assignee: DEFEND GROUP CO., LTD., Kaohsiung (TW)

( * ) Notice: Subject to any disclaimer, the term of this patent is extended or adjusted under 35 U.S.C. 154(b) by 0 days.

(21) Appl. No.: 15/691,873

(22) Filed: Aug. 31, 2017

(65) Prior Publication Data

US 2018/0072225 A1    Mar. 15, 2018

(30) Foreign Application Priority Data

Sep. 9, 2016 (TW) ............... 105214049 U
Feb. 9, 2017 (TW) ............... 106201919 U (51) Int. Cl.
| | |
|---|---|
| B60Q 1/52 | (2006.01) |
| B60Q 9/00 | (2006.01) |
| B60Q 1/26 | (2006.01) |
| G01D 5/14 | (2006.01) |
| G01D 5/20 | (2006.01) |

(52) U.S. Cl.
CPC ........... B60Q 9/008 (2013.01); B60Q 1/2661 (2013.01); B60Q 1/2696 (2013.01); G01D 5/145 (2013.01); G01D 5/20 (2013.01)

(58) Field of Classification Search
CPC . B60Q 1/32; B60Q 1/323; B60Q 1/26; B60Q 1/2615; B60Q 1/2696; B60Q 9/008; B60Q 1/2661; G01D 5/20; G01D 5/145

USPC .......................................... 340/468, 471, 472
See application file for complete search history.

(56) References Cited

U.S. PATENT DOCUMENTS

| | | | | |
|---|---|---|---|---|
| 5,121,098 | A * | 6/1992 | Chen ................... | B60Q 1/2696 340/473 |
| 5,523,926 | A * | 6/1996 | Gold ....................... | B60Q 1/30 340/472 |
| 6,252,500 | B1 * | 6/2001 | Chueh ................... | B60Q 1/323 340/472 |
| 9,637,965 | B1 * | 5/2017 | Kothari ................. | B60J 5/0493 |
| 2011/0260848 | A1 * | 10/2011 | Rodriguez Barros ...... | B60Q 1/2665 340/438 |
| 2015/0002288 | A1 * | 1/2015 | Lee ....................... | B60Q 1/46 340/471 |

* cited by examiner

Primary Examiner — Thomas Mullen
(74) Attorney, Agent, or Firm — Bacon & Thomas, PLLC (57) ABSTRACT

The present disclosure illustrates a wireless warning light for vehicle door, including light assembly and magnet, and the light assembly includes shell member, transparent cover and baseboard. The shell member includes chamber and bottom surface, and the transparent cover is configured to cover and enclose the chamber of the shell member, the baseboard is accommodated in the chamber and includes a circuit block and a battery, the circuit block includes a magnetic field sensing switch and a LED. The wireless warning light is installed on a side of the vehicle door. When the magnetic field sensing switch senses magnetic field of the magnet, the LED is turned off, and when the magnetic field sensing switch senses absence of magnetic field, the LED emits light. Therefore, the wireless warning light having self-owned power source without external power line may be provided to remind the vehicle from behind.

9 Claims, 10 Drawing Sheets

WIRELESS WARNING LIGHT FOR VEHICLE DOOR

BACKGROUND OF THE INVENTION

1. Field of the Invention

The present disclosure relates to a warning light, more particularly to a wireless warning light installed on an end surface of a vehicle door and configured to emit flashing light to warn vehicle and pedestrian approaching from behind, thereby decreasing traffic accident.

2. Description of the Related Art

The traffic accident caused by a driver who opens vehicle door without noticing whether there is vehicle approaching from behind continues to be reported, and incident cases that the motorcycle or bicycle riders are too late to dodge the opened doors and fall down to get hurt or die are too numerous to mention one by one. In order to prevent such traffic accidents, the government publicizes that the person in the vehicle should notice the vehicle from behind when opening a vehicle door, and also suggests that the person in vehicle should form a habit of using a hand remote from the vehicle door to open the vehicle door, so that the person may face the vehicle door to observe whether there is vehicle approaching from behind; or, the person in vehicle may open the vehicle door in two stages, that is, the person opens the vehicle door by a few centimeters to confirm that there is no vehicle or pedestrian approaching from behind, and then open the vehicle door after confirmation, thereby avoiding aforementioned traffic accidents.

In order to solve the aforementioned problem, there are some products available in marketplace, for example, a rearview mirror for a passenger at rear seat which may be installed at a reflector on a rear vehicle door, so that the passenger at rear seat may observe whether there is a vehicle approaching from behind when the passenger wants to get out of the vehicle, thereby improving traffic safety.

Furthermore, there is also warning device available in marketplace, such as an anti-collision warning device for opening door to get out of vehicle, and such device uses a sensor installed on a rear-view mirror outside the vehicle to sense whether there is a vehicle approaching from behind. When the sensor senses that there is a vehicle approaching from behind and the person touches the handle of the vehicle door at the same time, the anti-collision warning device may make sound or emit warning light to warn the person in the vehicle and other vehicle approaching from behind.

Furthermore, there are other warning devices providing similar functions. For example, suppose that such warning device is installed in vehicle, when the warning device senses other vehicle approaching from behind within a predetermined safe distance, a control module of the waning device sends a signal to a central control locking system to temporarily lock the vehicle door. Alternatively, a door of vehicle may be designed to have two-stage open mechanism, to prevent a person in the vehicle from opening the door quickly, thereby increasing a brake response time for other vehicle approaching from behind.

However, installations and detachments of the aforementioned warning devices are complex and require a professional to perform through complicated processes, and even some warning devices must be electrically connected to power source of the vehicle and may interfere with and cause failure of a computer of the vehicle because of improper installation. Some devices are so expensive that the user is less willing to buy or install.

Therefore, what is need is to develop a warning device which may solve aforementioned problem and have advantages of low manufacturing cost, simple structure and easy installation.

SUMMARY OF THE INVENTION

In order to solve aforementioned problem, the present disclosure is to provide a wireless warning light for vehicle door, and the wireless warning light is able to flash light through a crack of the vehicle door to remind the vehicle from behind when the vehicle door is opened. Furthermore, the wireless warning light of the present disclosure has its own power source, is easy to install without connecting with a power source of the vehicle, and is able to reduce traffic accident effectively.

According to an embodiment, the present disclosure provides a wireless warning light for vehicle door, and the wireless warning light includes a light assembly and a magnet, and the light assembly includes a shell member, a transparent cover and a baseboard. The shell member includes a chamber and a bottom surface, and the transparent cover is configured to cover and enclose the chamber of the shell member, the baseboard is accommodated in the chamber and includes a circuit block and a power source device, the circuit block includes a magnetic field sensing switch and at least one light emitting diode (LED), and the power source device includes a battery holder and a battery. When the magnetic field sensing switch senses magnetic field of the magnet, the LED is turned off, and when the magnetic field sensing switch senses absence of magnetic field of the magnet, the LED emits light.

Preferably, the magnetic field sensing switch may be a Hall device, a reed switch or a magnetic induction device.

Preferably, the shell member includes a plug formed on a bottom surface thereof, and the plug is configured to tuck into an installing hole of a vehicle.

Preferably, the plug includes an oblique cone surface and a lower annular recess.

Preferably, the shell member includes an upper annular recess, and the transparent cover includes a protrusion ring which is configured to engage into the upper annular recess to make the light assembly waterproof.

Preferably, the magnet is fixed in a magnet holder.

Preferably, the magnet holder includes two arm plates which are configured to clamp a vehicle body.

Preferably, each of the two arm plates includes at least one anti-slip strip on an inner side thereof.

Preferably, the magnet holder includes a magnet fixing hole configured to fix the magnet.

Preferably, the magnet or the light assembly is fixed on the vehicle body by an adhesive manner.

As a result, when the vehicle door is closed, the magnetic field sensing switch senses magnetic field of the magnet, the LED is driven to turn off, and when the vehicle is opened, the magnetic field sensing switch senses absence of magnetic field of the magnet, the LED is driven to flash light to remind the vehicle from behind. Furthermore, the wireless warning light of the present disclosure uses the Hall device, the reed switch or the magnetic induction device as the magnetic field sensing switch, and has self-owned power source without connecting an external power source, and has low power consumption. Furthermore, the wireless warning light may be attached on the vehicle door and the vehicle, or tucked into an existing installation hole of the vehicle door, thereby completing the installation of the wireless warning light conveniently.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Figure 1:
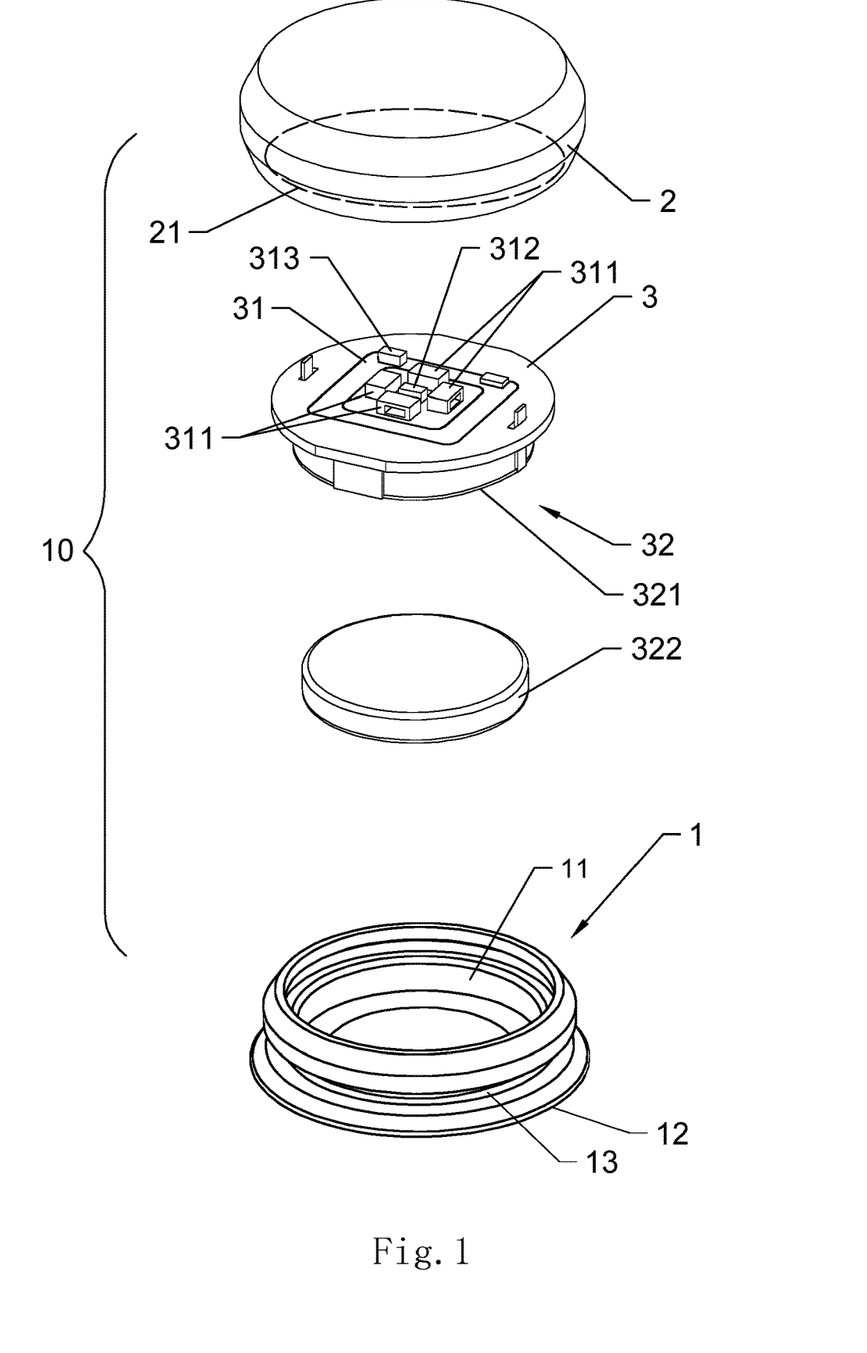
FIG. 1 is an exploded view of a first embodiment of a wireless warning light for vehicle door, in accordance with the present disclosure.
Figure 2:
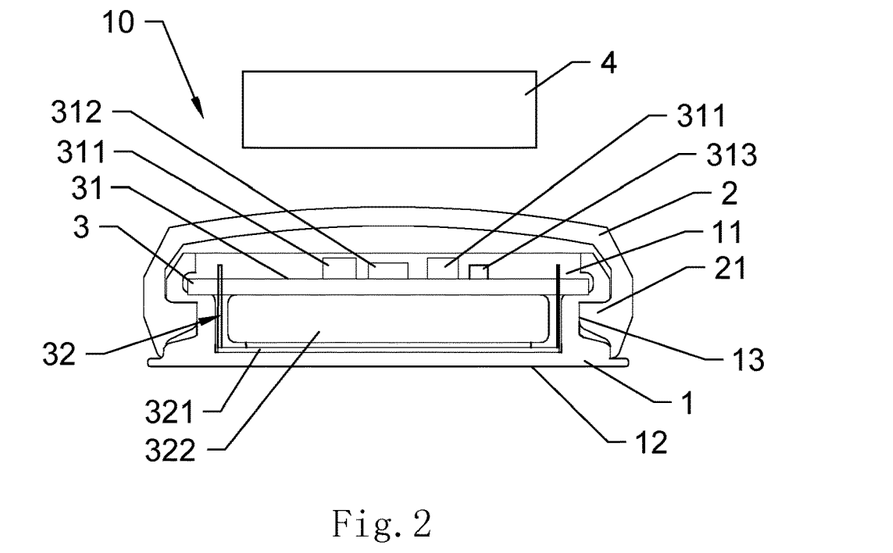
FIG. 2 is a sectional view of an assembly of the first embodiment of the present disclosure.

The following refers to FIGS. 1 and 2, which are exploded veiws of a first embodiment of a wireless warning light, and sectional view of an assembly of the first embodiment, in accordance with the present disclosure. The wireless warning light includes a light assembly 10 and a magnet 4, and the light assembly 10 includes a shell member 1, a transparent cover 2 and a baseboard 3. The shell member 1 includes a chamber 11, a bottom surface 12 and an upper annular recess 13. Preferably, the shell member 1 is a hollow box body made by plastic, silica gel or rubber material, and has advantages of good insulation, low cost, and easy-to-manufacture.

Preferably, the transparent cover 2 is a cover made by plastic, or silica gel material, has transparence, and has advantages of good insulation and low cost, and easy-to-manufacture. The transparent cover 2 may include a protrusion ring 21 protruded inwardly, and when the transparent cover 2 covers and encloses the chamber 11 of the shell member 1, the protrusion ring 21 of the transparent cover 2 may be engaged into the upper annular recess 13, so that the transparent cover 2 may tightly cover the shell member 1 and enclose the chamber 11, thereby making the entire light assembly 10 waterproof.

The baseboard 3 is accommodated in the chamber 11, and includes a circuit block 31 and a power source device 32. The circuit block 31 is a circuit board including a basic circuit, and the circuit block 31 is electrically coupled to at least one light emitting diode (LED) 311, a magnetic field sensing switch 312 and a flashing control component 313. Preferably, the light emitting diode 311 may be a high brightness LED, and there may be at least one light emitting diode 311, for example, four light emitting diodes 311 in a cross arrangement, as shown in FIG. 1.

The magnetic field sensing switch 312 is a magnetic induction actuating device, such as a reed switch, a magnetic switch, a Hall device or other magnetic induction device. The magnetic field sensing switch 312 is able to sense a change of magnetic field, and further control other electronic components through the basic circuit of the circuit block 31 according to the sensed change. The flashing control component 313 is a driving component configured to drive the light emitting diode 311 to flash. The flashing control component 313 may be implemented by a single electronic component electrically coupled to the circuit block 31 (as shown in FIG. 1), or a flashing control circuit built in the circuit block 31 according to current circuit board technology.

The power source device 32 includes a battery holder 321 and a battery 322. Preferably, the battery holder 321 is a plastic plate, a Bakelite plate or a metal plate. Several support structures (not labeled in FIG. 1) are fixed under the baseboard 3, and the battery 322 may be placed into space formed between the battery holder 321 and the baseboard 3. Preferably, the battery 322 is a mercury battery or a button cell battery.

Figure 3:
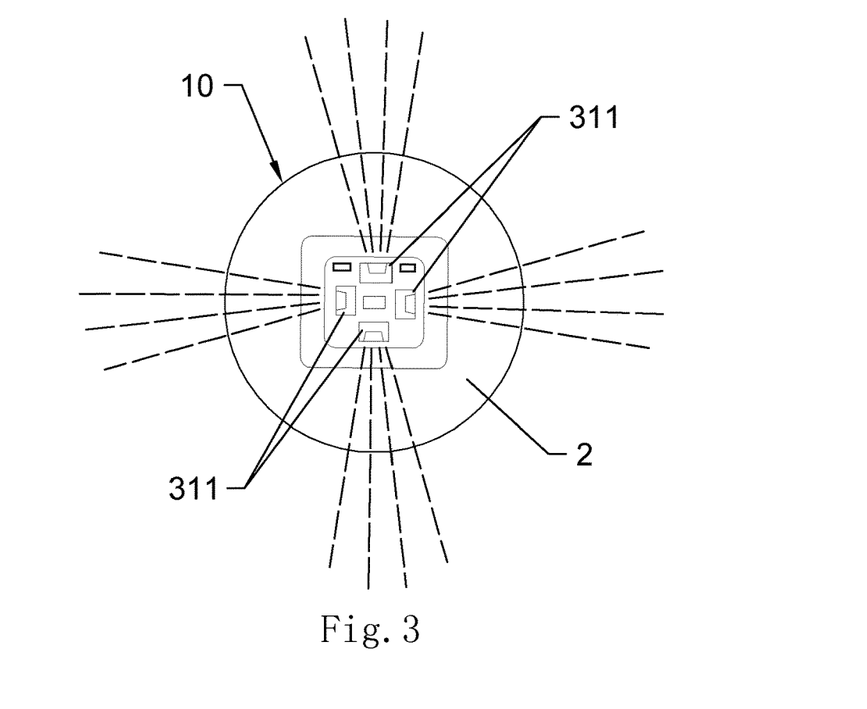
FIG. 3 is a front view of the assembly of the first embodiment of the present disclosure.

Please refer to FIG. 3, which is a front view assembly of the first embodiment of the present disclosure. Four light emitting diodes 311 are in cross arrangement and emit light outwardly, so that the light emitting diode 311 may emit or flash cross-star-like dazzling light to attract more attention.

Figure 4:
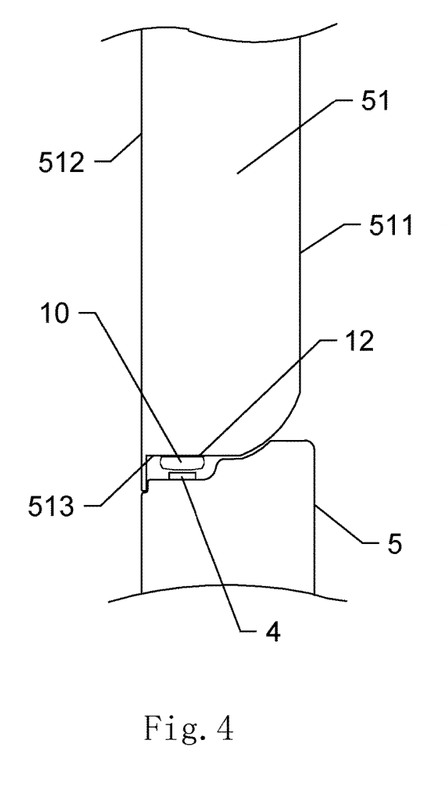
FIG. 4 is a schematic view of the first embodiment installed on the vehicle of which door is closed.

FIG. 4 is a schematic view of the first embodiment installed on the vehicle of which door is closed. Even if the vehicle door the vehicle is closed, a space is still kept between the vehicle door and the vehicle body, as shown in FIG. 4, when the vehicle door 51 of the vehicle body 5 is closed, there is an end surface 513 of the vehicle door formed between the inner surface 511 of the vehicle door 51 and the outer side 512 of the vehicle body 5, and a few centimeters of space is formed between the end surface 513 and the vehicle body 5, such as the space formed between front door and a B pillar of the vehicle, or the space formed between a back door and a C pillar of the vehicle, and the door lock mechanisms are usually installed in these spaces. A waterproof rubber strip is disposed in the space near the inner side 511 of the vehicle door to prevent liquid (such as rainwater) from entering the vehicle. In order to install the wireless warning light of the present disclosure, the bottom surface 12 of the light assembly 10 is adhered and fixed on the end surface 513 of the vehicle door 51 by fixing material (not shown in FIG. 4) such as double-sided adhesive tape, and the magnet 4 is directly attached, by magnetism thereof or the fixing material (not shown in FIG. 4) such as double-sided adhesive tape, on the vehicle body 5 correspondingly in position to the light assembly 10.

Please refer back to FIG. 2. When the magnetic field sensing switch 312 senses magnetic field of the magnet 4, the flashing control component 313 does not drive the light emitting diode 311 to flash; that is, when the magnetic field sensing switch 312 senses existence of the magnet 4, the light emitting diode 311 is turned off; when the magnetic field sensing switch 312 senses absence of magnetic field of the magnet 4, the light emitting diode 311 emits light. The following describes the function and operation of the control circuit.

Figure 6:
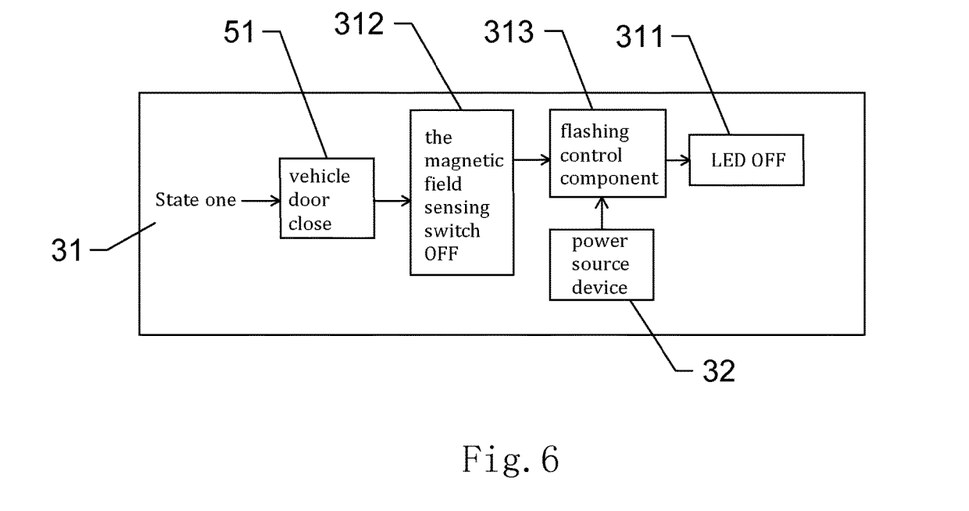
FIG. 6 is a block diagram of a control circuit for closing the vehicle door, in accordance with the present disclosure.

FIG. 6 is a block diagram of a control circuit for closing the vehicle door, in accordance with the present disclosure. When the vehicle door 51 is closed, the magnetic field sensing switch 312 of the circuit block 31 is affected by magnetic field of the magnet to be turned off (that is, in OFF state), that is, the power source device 32 is not conducted to the flashing control component 313, so the flashing control component 313 is unable to drive the LED 311 to flash light, and the LED 311 is turned off (that is, in LED OFF state). In this state, when the reed switch is used as the magnetic field sensing switch 312, the switch is mechanically operated, so the entire circuit does not flow current to consume power when the entire circuit is not turned on. If the Hall device is used as the magnetic field sensing switch 312, the power source device 32 must provide a very small amount of current to the Hall device only for detection of the change of magnetic field. As a result, in an experiment of the present disclosure, a 3V button cell battery (model No. CR-2032) is used as the battery 32, and is able to provide power to the wireless warning light in standby state for more than one year.

Figure 5:
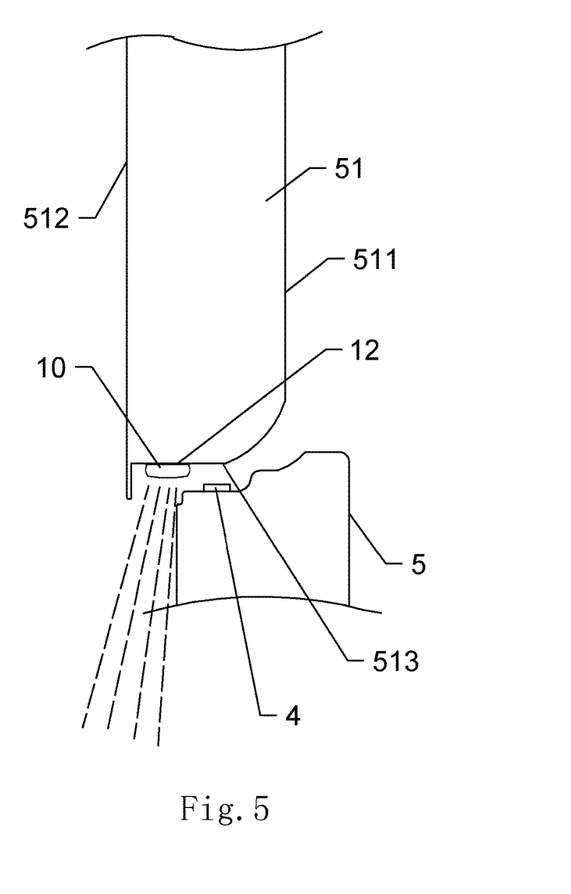
FIG. 5 is a schematic view of the first embodiment installed on the vehicle of which door is opened.

Following refers to FIG. 5, which is a schematic view of the first embodiment installed on the vehicle of which door is opened. As shown in FIG. 5, when the vehicle door 51 of the vehicle body 5 is opened from the closed state, the light assembly 10 is moved away from the magnet 4, and the magnetic field sensing switch 312 may sense absence of magnetic field of the magnet 4, so that the LED 311 starts to flash. The following describes an operation of related circuit.

Figure 7:
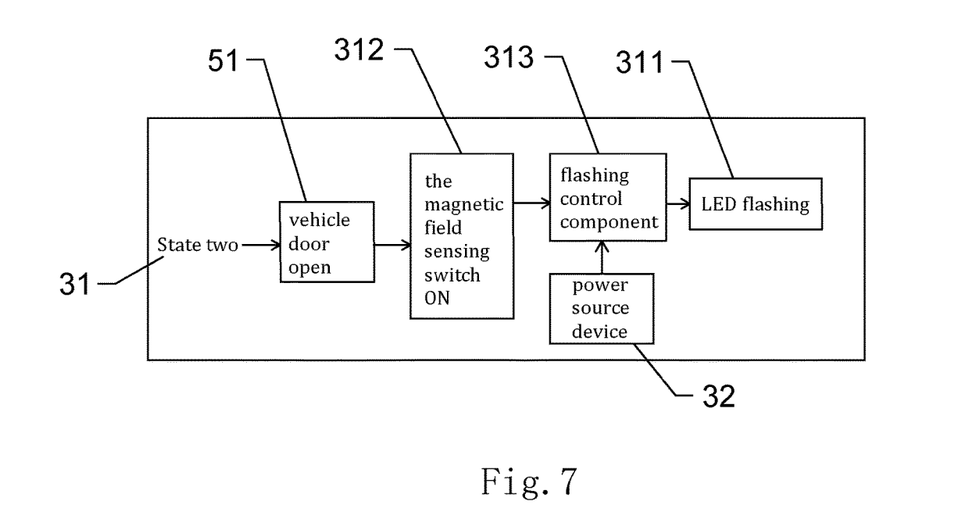
FIG. 7 is a block diagram of a control circuit for opening the vehicle door, in accordance with the present disclosure.

Please also refer to FIG. 7, which is a block diagram of a control circuit for opening the vehicle door, in accordance with the present disclosure. When the vehicle door vehicle door is opened, the light assembly 10 is moved with the vehicle door 51 away from the magnet 4, the magnetic field sensing switch 312 of the circuit block 31 may sense absence of magnetic field of the magnet 4 and then become the ON state, that is, the power source device 32 is conducted with the flashing control component 313, so that the flashing control component 313 may drive the LED 311 to flash light. As shown in FIG. 5, the light assembly 10 backwardly flashes light through the crack of the vehicle door 51, thereby reminding vehicle or pedestrian from behind. In the experiment of the present disclosure, a 3V button cell battery (model No. CR-2032) is used as the battery 322. While flashing light, the LED 311 may consume more power than the LED 311 in a standby mode, but four high brightness LEDs of one watt may keep lighting for dozens of hours with power supply of the 3V button cell battery; furthermore, the vehicle door is seldom kept opened for a long time, so a duration that the LED 311 flashes light is not long actually. As a result, the wireless warning light of the present disclosure does not need battery replacement frequently. According to experimental test, a new CR-2032 battery may enable the wireless warning light of the present disclosure to flash light for at least 4800 minutes; suppose that the vehicle door may be opened for 5 to 10 minutes a day, the wireless warning light may need to replace battery merely every two and a half years or every 3 years.

The manner of installing the wireless warning light of the present disclosure on the vehicle door to remind the vehicle or pedestrian from behind is effective to prevent car accident, the reason is that a person may have a view range of 180° to 200° when the person does not move, but only most clearly see the object in the view range of 3° to 10° and not easy to distinguish shape and color of the object located out of aforementioned view range which is called "the visual cone angle". However, the person has smaller view angle while moving faster. For example, when a speed of the vehicle reaches 30 KPH, the view angle of the driver is reduced to the range of 100° to 110°, and the visual cone angle of the driver is further reduced to the range of 3° to 5°, so the driver is hard to recognize the scene or the object located out of the visual cone angle, but the driver may be particularly attracted within 0.2 second by the moving or flashing object in the peripheral view range out of the visual cone angle. For this reason, when the door of the front vehicle is opened and the flashing light is emitted from the crack of the vehicle door, the vehicle from behind may be reminded more early to decelerate or dodge.

Figure 8:
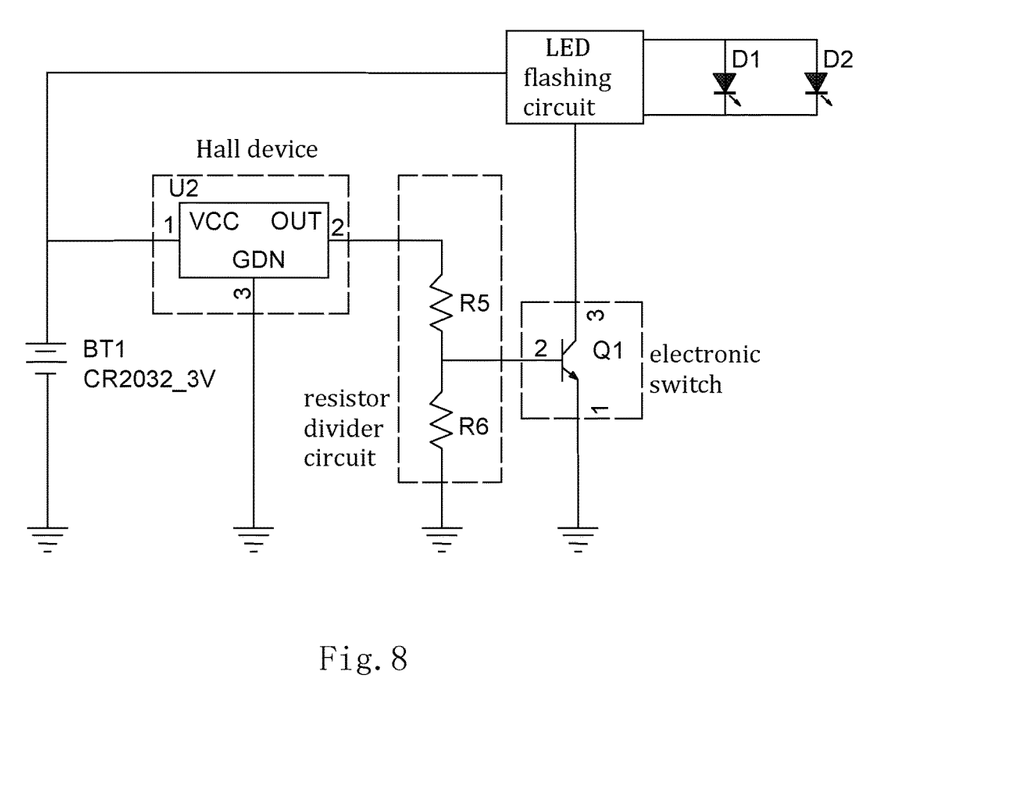
FIG. 8 is a circuit diagram of the wireless warning light of the present disclosure.

FIG. 8 is a circuit diagram of a preferred embodiment of the present disclosure. In this embodiment, the 3V button cell battery (model No. CR2032) is used as the battery; a resistor-divider circuit, an electronic switch and a LED flashing control circuit may form a simple RC resonant circuit without integrated circuit such as a comparator, thereby having advantage of low cost and low power consumption. When the Hall device senses the magnetic field, the Hall device outputs a low-level (LOW) signal (that is, a voltage level of ground GND) to turn off the electronic switch Q1 and the LED flashing control circuit. When the Hall device does not sense the magnetic field, the Hall device outputs a high-level (HIGH) signal (that is, a voltage level of the battery power BT1) to turn on the electronic switch Q1, thereby activating the LED flashing control circuit to drive the LEDs D1 and D2 to flash light. Preferably, this circuit may be connected with more LEDs (such as D3 and D4) in parallel.

Figure 9:
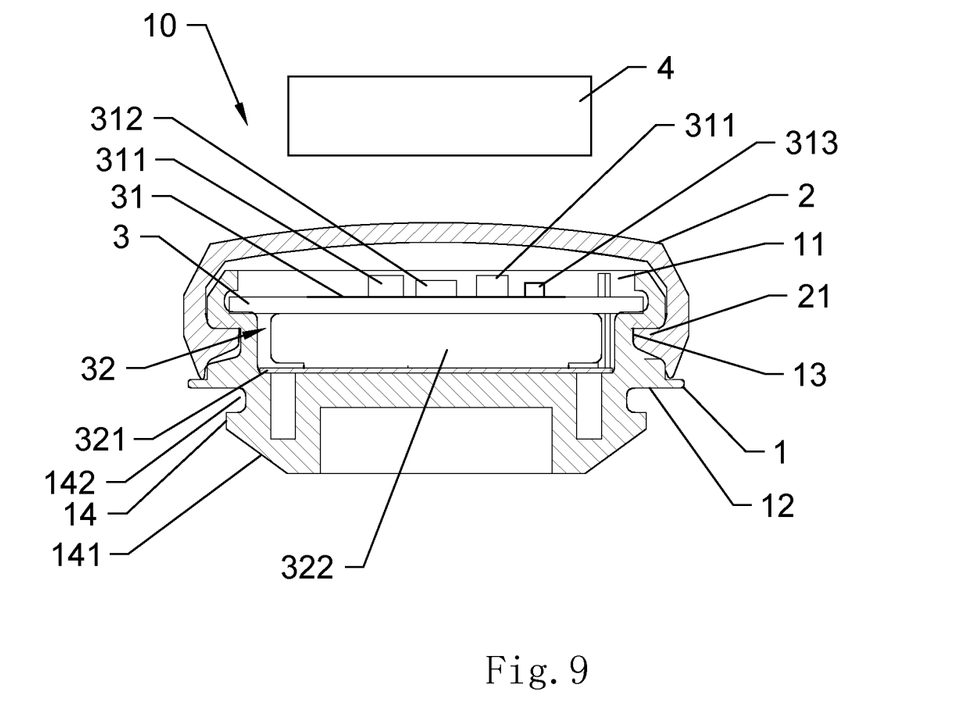
FIG. 9 is a sectional view of an assembly of a second embodiment of the wireless warning light for vehicle door, in accordance with the present disclosure.

The following refer to FIGS. 8 and 9, which shows a circuit of a preferred embodiment of the present disclosure, and a sectional view of assembly a second embodiment of the present disclosure. In the second embodiment, the wireless warning light includes a light assembly 10 and a magnet 4, and the light assembly 10 includes a shell member 1, a transparent cover 2 and a baseboard 3. Most of components and features of the second embodiment are the same as that of the first embodiment. The shell member 1 includes a chamber 11, a bottom surface 12 and an upper annular recess 13. Preferably, the transparent cover 2 is a circular cover made by plastic, or silica gel material, has transparence, and has advantages of good insulation and low cost, and easy-to-manufacture. The transparent cover 2 may include a protrusion ring 21 protruded inwardly, and when the transparent cover 2 covers and encloses the chamber 11 of the shell member 1, the protrusion ring 21 of the transparent cover 2 may be engaged into the upper annular recess 13, so that the transparent cover 2 may tightly cover the shell member 1 and enclose the chamber 11, thereby making the entire light assembly 10 waterproof. The baseboard 3 is accommodated in the chamber 11, and includes a circuit block 31 and a power source device 32. The circuit block 31 is a circuit board including a basic circuit, and the circuit block 31 is electrically coupled to at least one light emitting diode 311, a magnetic field sensing switch 312 and flashing control component 313. Preferably, the light emitting diode 311 is a high brightness LED, and there is at least one light emitting diode 311, for example, four light emitting diodes 311 in a cross arrangement, as shown in FIG. 1. The magnetic field sensing switch 312 is a magnetic induction actuating device, such as a reed switch, a magnetic switch, a Hall device or other magnetic induction device. The flashing control component 313 is a driving component configured to drive the light emitting diode 311 to flash. The flashing control component 313 may be implemented by a single electronic component electrically coupled to the circuit block 31 (as shown in FIG. 1), or a flashing control circuit built in the circuit block 31 according to current circuit board technology. The power source device 32 may include a battery holder 321 and a battery 322. Preferably, the battery holder 321 is a plastic plate, a Bakelite plate or a metal plate. Several support structures (not labeled in FIG. 1) are fixed under the baseboard 3, and the battery 322 may be placed into a space formed between the battery holder 321 and the baseboard 3. Preferably, the battery 322 is a mercury battery or a button cell battery. The difference between the first embodiment and the second embodiment is that the shell member 1 of the second embodiment includes a plug 14 protruded at and extended from the bottom surface 12 thereof. The plug 14 is a slightly elastic object in a cylindrical shape; preferably, the plug 14 may be made by silica gel or rubber material, but the present disclosure is not limited thereto. The plug 14 is configured to tuck into an installing hole which commonly exists on the vehicle door of vehicle. The plug 14 may include an oblique cone surface 141, and a lower annular recess 142 is formed between the oblique cone surface 141 and the bottom surface 12.

Figure 10:
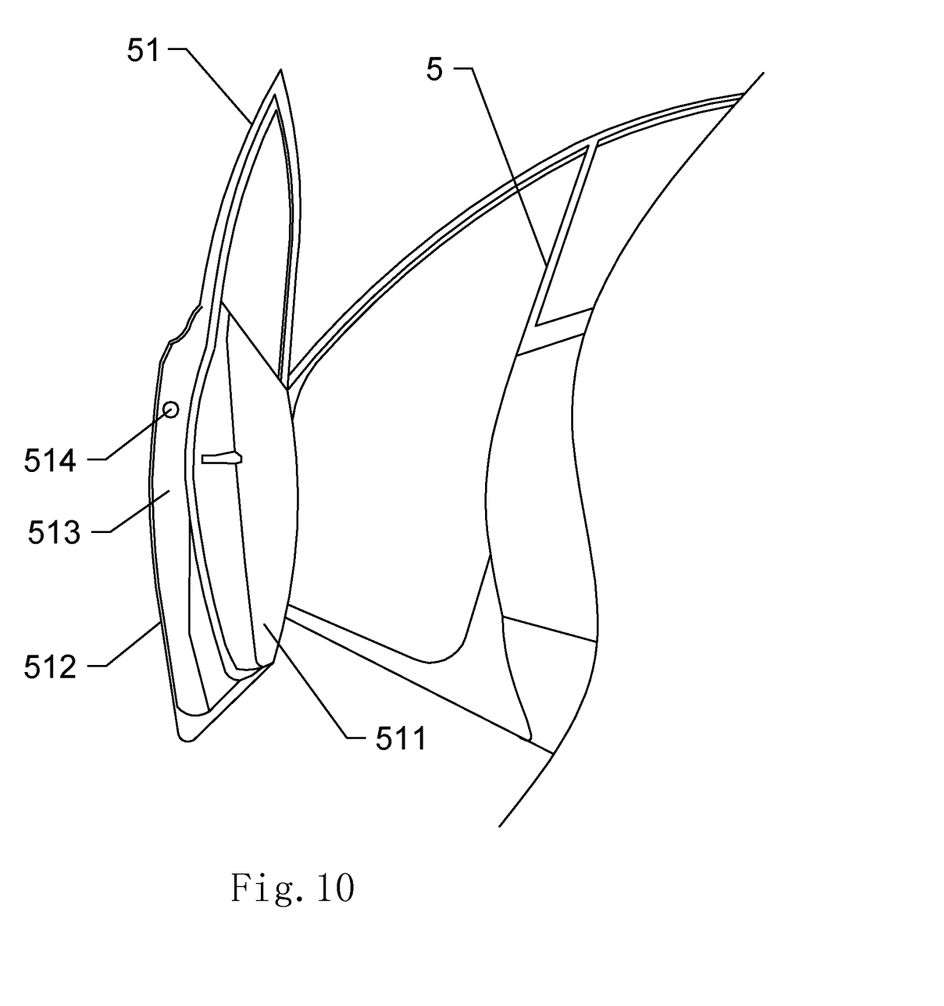
FIG. 10 is a schematic view showing a vehicle body to be installed with the second embodiment of the wireless warning light, in accordance with the present disclosure.

Please refer to FIG. 10, which is a schematic view of a vehicle body of common commercial vehicle. The vehicle body 5 of the vehicle is combined with a vehicle door 51, and the vehicle door 51 is usually provided with door handles separately disposed on an inner surface 511 and an outer side 512 thereof. The door handles are configured to unlock door locks to open the vehicle door 51. In order to install the lock mechanism inside the vehicle door, an installing hole 514 is usually formed on an end surface 513 of the vehicle door cut therethrough, and a rubber plug is inserted into the installing hole 514 before the vehicle leaves factory, thereby covering the installing hole 514 for better appearance and preventing from penetration of rainwater.

Figure 11:
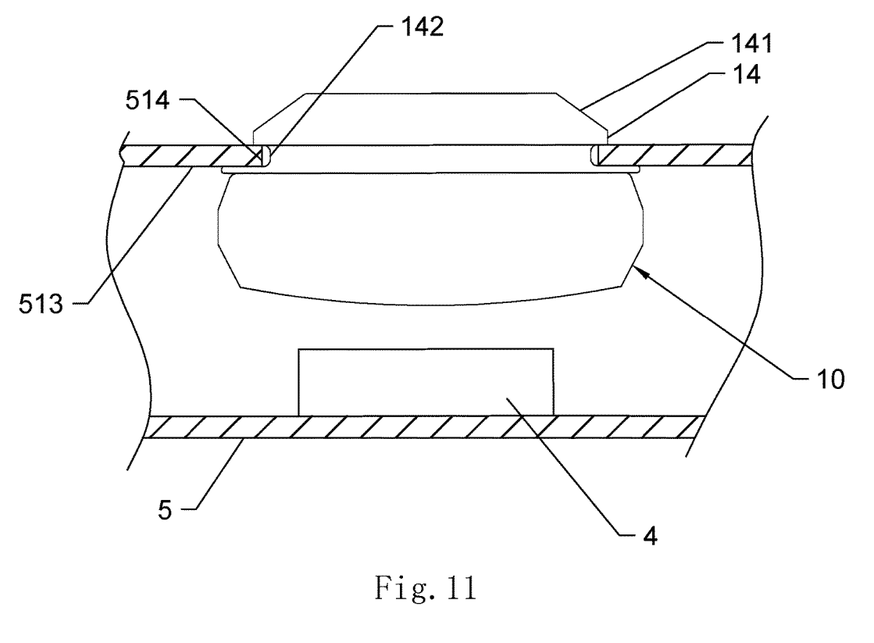
FIG. 11 is a schematic view of the second embodiment installed on the vehicle of which door is closed.

The following refers to FIG. 11, which is a schematic view of the second embodiment installed on the vehicle of which door is closed. In this embodiment, the light assembly 10 of the present disclosure is installed in the installing hole of the door handle of the vehicle door which is commonly provided in vehicle. In order to install the light assembly 10, the rubber plug configured to cover the installing hole 514 of the vehicle is removed, and the plug 14 of the light assembly 10 of the present disclosure is then inserted into the installing hole 514 through the oblique cone surface 141 thereof, to engage an edge of the installing hole 514 with the lower annular recess 142, thereby completing the mounting of the light assembly 10. Next, the magnet 4 may be attached on the vehicle body correspondingly in position to the light assembly 10. Preferably, the magnet 4 may be attached on the vehicle body by magnetism thereof, or by glue or double-sided adhesive tape. Compared with the first embodiment, the second embodiment of the present disclosure is to provide a structure which may be installed on the vehicle easily. The function and operation of the warning light of the second embodiment are the same as that of the first embodiment, so their detailed descriptions are not repeated.

Figure 12:
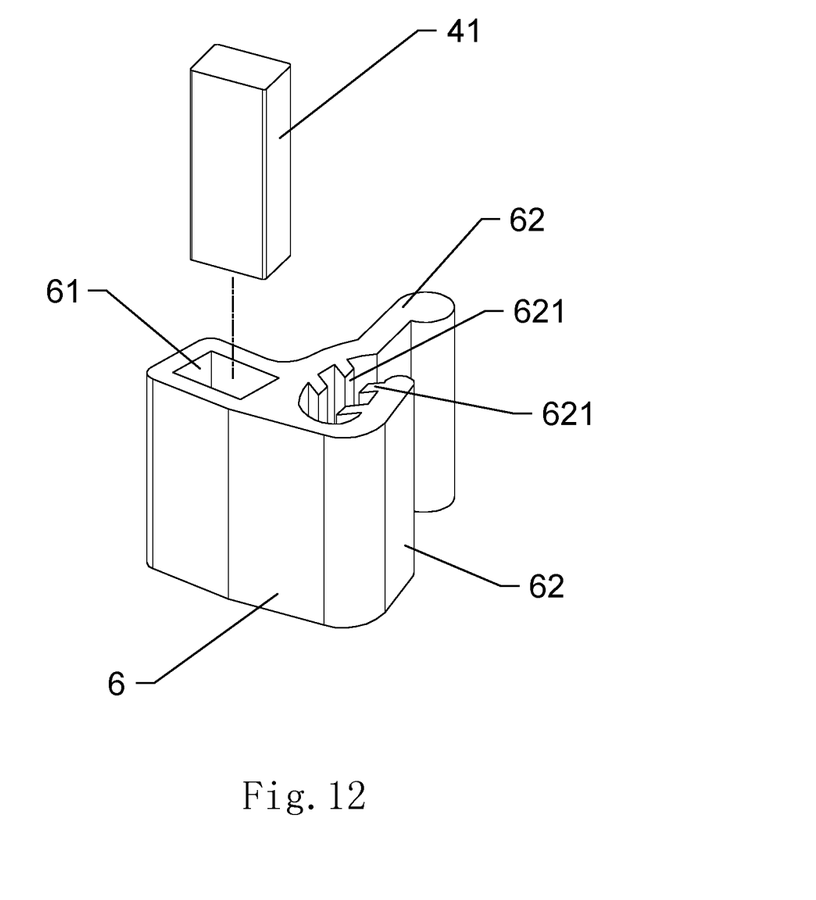
FIG. 12 is an exploded view of a magnet and a magnet holder of a third embodiment of the wireless warning light, in accordance with the present disclosure.

The following refers to FIG. 12, which is an exploded view of a magnet and a magnet holder of a third embodiment, in accordance with the present disclosure. Structures of the vehicle doors and the vehicle bodies of various types of vehicles with different brands are almost the same, but there is difference in positions and sizes of the vehicle doors and the vehicle bodies of these vehicles. The previous embodiments of the present disclosure may be applicable to most vehicle bodies, but in order to enable the wireless warning light of the present disclosure to more flexibly install on more types of vehicles, the third embodiment of the present disclosure may include a magnet holder 6 to fix a magnet 41. Preferably, the magnet holder 6 may be, not limited to, made by plastic material. The magnet holder 6 includes a magnet fixing hole 61. In the third embodiment, a size of the magnet 41 is slightly smaller than that of the magnet fixing hole 61, so the magnet 41 may be tightly fitted and fixed with the magnet fixing hole 61 after being tucked into the magnet fixing hole 61. The magnet holder 6 may include two arm plates 62 and a clamping space is formed between the two arm plates 62, so that the two arm plates 62 may be used to clamp on the vehicle body to fix the magnet holder 6. Preferably, the two arm plates 62 respectively have multiple anti-slip strips 621 disposed on inner sides thereof opposite to each other.

Figure 13:
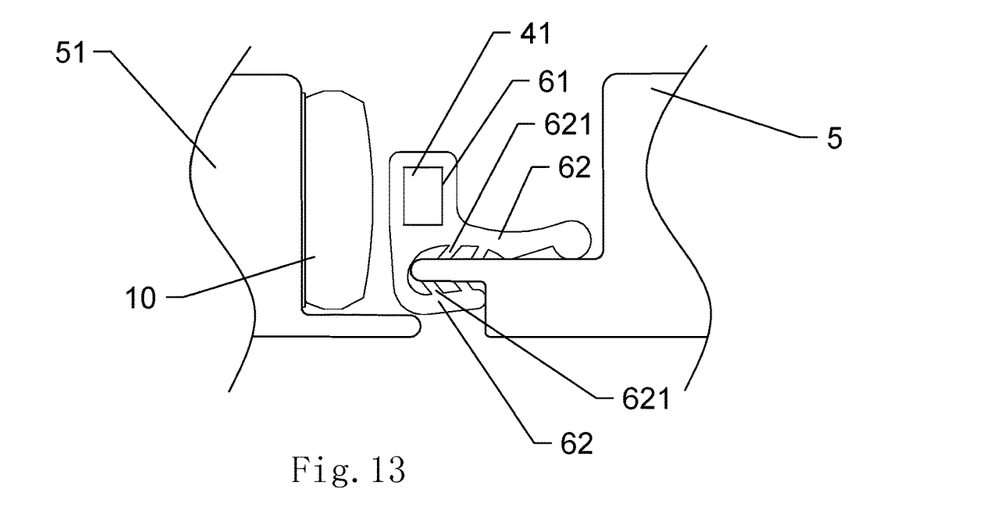
FIG. 13 is a schematic view of the third embodiment installed on the vehicle of which door is closed.

The following refers to FIG. 13, which is a schematic view of the third embodiment installed on the vehicle of which the door is closed. In the third embodiment, the light assembly 10 is fixed on the vehicle door 51 by a manner the same as that of the previous embodiments; and the vehicle is one of types of the commercial vehicles, as shown in FIG. 13, there is a larger distance between the vehicle body 5 and the vehicle door 51 of the vehicle of the third embodiment, and if the magnet 41 is directly attached on the vehicle body 5, the problem of poor induction may occur because of the overly larger distance from the light assembly 10. For this reason, in the third embodiment, the magnet 41 is fixed in the magnet fixing hole 61 of the magnet holder 6, and the magnet holder 6 is clamped on a sheet metal piece of the vehicle body 5 by two arm plates 62 thereof. Preferably, the position where the magnet holder 6 is clamped may be, not limited to, a B pillar of the vehicle. The two arm plates 62 include multiple anti-slip strips 621 respectively disposed on inner sides thereof opposite to each other. The magnet holder 6 may be made by flexible plastic material, so the anti-slip strips 621 may be flexibly pressed on the sheet metal piece, and the magnet holder 6 is prevented from falling-off. The sheet metal piece of the sheet metal pieces of most vehicles have limited, so that two arm plates 62 of the magnet holder 6 may provide sufficient clamping strength. After the magnet 41 is installed on the vehicle body, the light assembly 10 corresponds in position to the magnet 41, so the light assembly 10 does not emit light.

Figure 14:
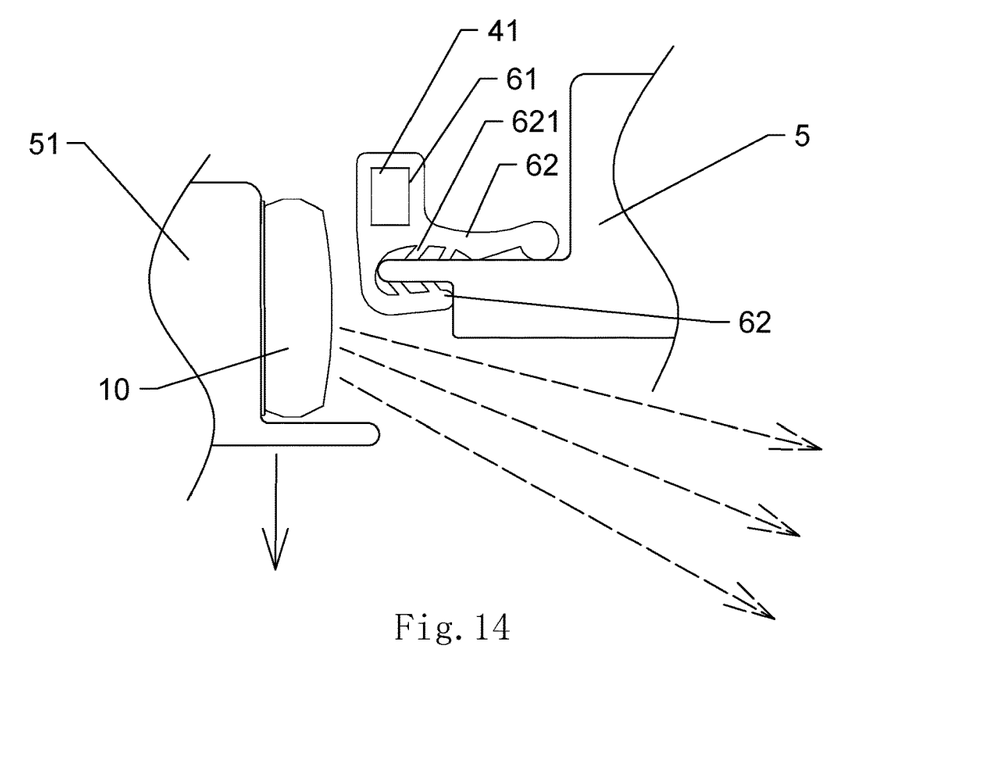
FIG. 14 is a schematic view of the third embodiment installed on the vehicle of which door is opened.

The following refers to FIG. 14, which is a schematic view of the third embodiment installed on the vehicle of which the door is opened. After the vehicle door 51 of the vehicle body 5 is opened from the closed state by an operating manner the same as the previous embodiments, the light assembly 10 is moved away from the magnet 41, so the magnetic field sensing switch senses absence of magnetic field of the magnet 41, and the LED is driven to flash light, thereby reminding the vehicle or pedestrian from behind. The flashing light is emitted from a darker crack of the vehicle door 51, so the flashing light clearly contrasts and dazzles for the vehicle and pedestrian from behind.

According aforementioned embodiments, the present disclosure uses a sensing system, which has self-owned power source, to determine whether the vehicle door is opened, and emits flashing light for warning upon the determination result, so that the vehicle and pedestrian from behind the vehicle may be aware, at the moment when the vehicle door is opened, that the vehicle door is being opened. When being alerted by the flashing light, the vehicle and pedestrian from behind may have a response time of a few tenths of second to prevent a car accident. The structure of the wireless warning light of the present disclosure is simple and easy to install without complicated components and mounting process, and the users may buy and install the wireless warning lights of the present disclosure by themselves, it improves the user's willingness to buy and install the wireless warning light of the present disclosure, as a result, the wireless warning light of the present disclosure may be more popular.

The wireless warning light of the present disclosure has features of being easy-to-install, and causing no interference to the original circuits of the vehicle. The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A wireless warning light for vehicle door, comprising a light assembly and a magnet, and the light assembly comprising a shell member, a transparent cover and a baseboard;

wherein the shell member comprises a chamber and a bottom surface, and the transparent cover is configured to cover and enclose the chamber of the shell member, the baseboard is accommodated in the chamber and comprises a circuit block and a power source device, the circuit block comprises a magnetic field sensing switch and at least one light emitting diode (LED), and the power source device comprises a battery holder and a battery;

wherein when the magnetic field sensing switch senses magnetic field of the magnet, the LED is turned off, and when the magnetic field sensing switch senses absence of magnetic field of the magnet, the LED emits light;

wherein the shell member comprises a plug formed on a bottom surface thereof, and the plug is configured to tuck into an installing hole of a vehicle.

2. The wireless warning light according to claim 1, wherein the magnetic field sensing switch is a Hall device, a reed switch or a magnetic induction device.

3. The wireless warning light according to claim 1, wherein the plug comprises an oblique cone surface and a lower annular recess.

4. The wireless warning light according to claim 3, further comprising a flashing control component which is configured to drive the LED to flash light.

5. The wireless warning light according to claim 4, wherein the magnet is fixed in a magnet holder.

6. The wireless warning light according to claim 5, wherein the magnet holder comprises two arm plates which are configured to clamp a vehicle body.

7. The wireless warning light according to claim 6, wherein each of the two arm plates comprises at least one anti-slip strip on an inner side thereof.

8. The wireless warning light according to claim 7, wherein the magnet holder comprises a magnet fixing hole configured to fix the magnet.

9. The wireless warning light according to claim 8, wherein the at least one LED comprises four LEDs in a cross arrangement.

\* \* \* \* \*